July 16, 1957      H. C. SAVINO      2,799,843
MOTOR VEHICLE SIGNAL DEVICE
Filed April 27, 1955
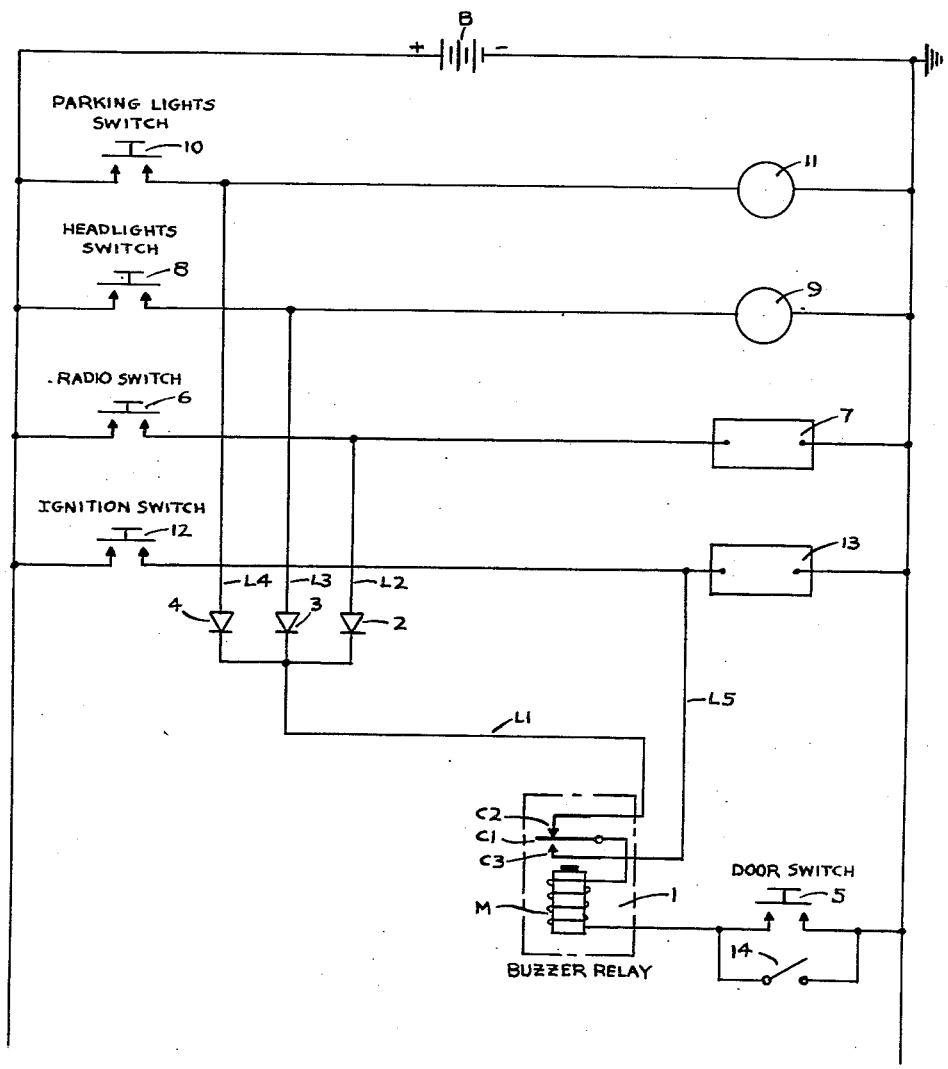
INVENTOR.
HENRY C. SAVINO

United States Patent Office 2,799,843
Patented July 16, 1957

2,799,843

MOTOR VEHICLE SIGNAL DEVICE

Henry C. Savino, Hackensack, N. J.

Application April 27, 1955, Serial No. 504,292

7 Claims. (Cl. 340—52)

This invention relates to motor vehicle signal devices, but is directed particularly to a signal device to warn motorists that electrically-operated devices, not normally turned off by the ignition key, have been left in an energized condition. Such electrically-operated devices may include the parking lights, the head lights, the radio, and other devices generally found in motor vehicles.

It is quite common for motorists to alight from their automobiles and, unknowingly, leave the lights and other electrically-operated devices energized. This often results in battery failures. Therefore, an object of the present invention is a warning signal device to eliminate unnecessary battery discharge in motor vehicles.

Another object of the invention is a warning device that will indicate the state of electrically-operated devices.

Yet another object of the present invention is a warning signal to indicate the state of electrically-operated devices when the motor engine is not operating.

A further object is a simple warning device that is readily adapted to motor vehicles.

Other objects of the present invention will become apparent in the course of the following specifications.

The invention will appear more clearly from the following description when taken in connection with the accompanying drawing showing by way of example preferred embodiment of the inventive idea.

The sole figure of the drawing is a diagram showing the circuits of the warning signal device and its adaptation to the motor vehicle circuits.

Referring to the drawing, the warning signal device consists of a buzzer relay 1 and its associated valve rectifiers 2, 3, 4. The buzzer relay 1 consists of an operating coil M and contacts C1, C2, C3. The buzzer relay is operated by placing a suitable voltage across the coil M at which time the contacts C1—C2 open and the contacts C1—C3 close. The diagram shows all circuits in a de-energized position with the contacts C1—C2 closed and C1—C3 open.

One side of the operating coil M is connected to one side of the motor vehicle car door switch 5, and also to one side of switch 14. The other side of the coil M is connected to the valve rectifiers 2, 3, 4 through the contacts C1—C2 and the conduit L1.

The vehicle door switch 5 is connected to the negative side of the battery power supply B. The door switch 5 is normally open when the door is closed and is in a closed position when the door is open. Therefore, when the vehicle door is open, the switch 5 is closed to connect the one side of the coil M to the negative side of the power source B.

The action of the switch 14 will subsequently be described.

The one side of the valve rectifier 2 is connected to the conduit L1, while the other side is connected to the radio switch 6 by conduit L2. The radio switch 6 controls the vehicle radio 7.

The one side of the rectifier 3 is connected to the conduit L1, while the other side is connected to the headlights switch 8 by conduit L3. The headlights switch 8 controls the headlights 9.

Likewise, the rectifier 4 is connected to the conduit L1 and the parking lights switch 10 by conduit L4. The switch 10 controls the parking lights 11.

The ignition switch 12 controls the vehicle ignition circuits 13, with one side of the switch 12 connected to the contact C3 of the buzzer relay 1 by way of conduit L5.

It is apparent from the circuits of the drawing that whenever any one or all of the switches 6, 8, and 10 are in a closed position the positive side of the power source B is connected to the contact C2 through the valve rectifiers 2, 3, and 4. Likewise, when the ignition switch 12 is closed, the positive side of the power source B is connected to the contact C3.

The valve rectifiers 2, 3, 4 conduct current in one direction only, that is in the direction of the arrows shown in the diagram. These rectifiers prevent back feed of current from one circuit to another, as would occur in this case since the switches 6, 8, 10 feed into the common conduit L1.

To illustrate the invention, let it be assumed that a motorist stops his vehicle with the headlights 9 energized, turns off the ignition switch 12 and opens the door to depart, unaware that the headlights 9 are energized. Under the above conditions, the headlights switch 8 and the door switch 5 are closed, with all of the other switches open. The operating coil M of the buzzer relay 1 becomes energized by way of the positive side of the power source B, the switch 8, conduit L3, the rectifier 3, the conduit L1, the contacts C2—C1, the coil M, the door switch 5, and the negative side of the power source B. As previously mentioned, with the coil M energized, the relay 1 operates to open the contacts C1—C2 and closes the contacts C1—C3. The closure of contacts C1—C3 has no effect in this instance since the ignition switch 12 is open. However, the opening of the contacts C1—C2 breaks the circuit to the coil M, de-energizing the relay 1. The contacts C1—C2 close and C1—C3 open again, with the result that the coil M again is energized to operate the relay 1 and repeat the cycle. This oscillating action produces an audible signal to warn the motorist that one of the electrically-operated devices has been left in an energized position.

It is apparent that if the motorist had left the parking lights 11 or the radio 7 energized, the same warning signal would be given since switch 6 or 10 would be closed.

To insure that the warning signal is given only under the condition where the electrically-operated devices are energized with the ignition switch 12 in the open position, contacts C1—C3 are used. If, in the example previously described, the ignition switch were in a closed position, the oscillating or buzzer action of the relay 1 would not occur. This is due to the fact that even though contacts C1—C2 open to break the circuit to the coil M, the closure of the contacts C1—C3 provide another current feed from the positive side of the battery source B, the ignition switch 12, the conduit L5, the contacts C1—C3 and the coil M. This will keep the coil M continuously energized and no oscillation can take place.

Where the motorist wishes to be warned prior to opening the door, the switch 14 is provided to short the door switch 5. With the switch 14 closed, the motorist is given a warning signal when the ignition switch 12 is turned off if any of the electrically-operated devices are energized.

It is apparent that the examples shown above were given solely by way of illustration and not by way of limitation, and they are subject to many variations and modifications without exceeding the scope of the present invention. All such variations and modifications are to be included within the scope of the present invention.

What is claimed:

1. A signalling system for a motor vehicle provided with an ignition switch comprising, a source of electric power, a signalling device connected by parallel circuits to a plurality of electrically-operated accessories whereby said signalling device is made operative when at least one of said accessories is energized, circuit means included in said circuits to prevent current feedback from one parallel circuit into another, and a circuit connection between the signalling device and the vehicle ignition switch to render said signalling device inoperative when said ignition switch is in the on position.

2. A signalling system for a motor vehicle provided with an ignition switch comprising, a source of electric power, a signalling device connected by parallel circuits to a plurality of electrically-operated accessories whereby said signalling device is made operative when at least one of said accessories is energized, unidirectional conducting elements included in said parallel circuits to prevent current feedback from one parallel circuit into another, and a circuit connection between the signalling device and the vehicle ignition switch to render said signalling device inoperative when said ignition switch is in the on position.

3. A signalling system for a motor vehicle provided with an ignition switch comprising, a source of electric power, a signalling device connected by parallel circuits to a plurality of electrically-operated accessories whereby said signalling device is made operative when at least one of said accessories is energized, unidirectional conducting elements included in said parallel circuits to prevent current feedback from one parallel circuit into another, a door switch contact placed in series with said signalling device to render it operative only when the vehicle door is in the open position, and a circuit connection between the signalling device and the vehicle ignition switch to render said signalling device inoperative when said switch is in the on position.

4. A signalling system for a motor vehicle provided with an ignition switch comprising, a source of electric power, a buzzer relay signalling device having two spaced fixed contacts, a winding, a movable contact connected with said winding, one of said fixed contacts being connected by parallel circuits to a plurality of electrically operated accessories, said signalling device being operative when at least one of said accessories is energized, unidirectional conducting elements included in said parallel circuits to prevent current feedback from one parallel circuit into another, a door switch contact connected in series with the winding of said signalling device and said source to render it operative only when the vehicle door is in the open position, said movable contact being operated by the winding when energized to engage the other one of said fixed contacts, the movable contact being in engagement with the first-mentioned fixed contact, when the winding is deenergized, circuit means connecting the movable contact to one lead of the winding, and further circuit means connecting the vehicle ignition circuit to the second mentioned fixed contact, whereby the signalling device is rendered inoperative when the ignition switch is in the on position and the ignition circuit is energized.

5. A signalling system for a motor vehicle having a door, a source of electric power and an ignition switch connected with said source, said system comprising a signalling device connected in parallel to an electrically-operated accessory to be made operative when said accessory is energized, a door switch connected in series with said signalling device to render it operative only when the door is in the open position, and a circuit connection between the signalling device and the vehicle ignition switch to render said signalling device inoperative when said ignition switch is in the on position.

6. A signalling system for a motor vehicle having a source of electric power and an ignition switch connected with said source, said system comprising a buzzer relay having an operating coil connected with said source, two spaced fixed contacts, and a movable contact connected with said coil, one of said fixed contacts being connected in parallel to an electrically-operated accessory, said buzzer relay being made operative when said accessory is energized, and a circuit connection between said ignition switch and said coil and the other one of said fixed contacts to render said relay inoperative when said ignition switch is in the on position.

7. A signalling system for a motor vehicle having a door, a source of electric power, an ignition switch, and an electrically-operated accessory, said ignition switch and said accessory being connected in parallel with said source, said system comprising a signalling device, and circuits connecting said signalling device in parallel to said accessory and said ignition switch to render said signalling device operable when said accessory is energized and to render said signalling device inoperative when said ignition switch is in the on position, said circuits comprising unidirectional conducting elements to prevent current feed back and a door switch in series with said signalling device to render it operable only when the door is in the open position.

References Cited in the file of this patent

UNITED STATES PATENTS

| | | |
|---|---|---|
| 2,101,407 | Morland | Dec. 7, 1937 |
| 2,565,323 | Quinn | Aug. 21, 1951 |
| 2,581,338 | La Roza | Jan. 8, 1952 |
| 2,722,673 | Turner | Nov. 1, 1955 |
| 2,742,630 | Muncheryan | Apr. 17, 1956 |
| 2,756,408 | McKaig | July 24, 1956 |